US011666063B2

(12) United States Patent
Matejuk et al.

(10) Patent No.: US 11,666,063 B2
(45) Date of Patent: Jun. 6, 2023

(54) METHOD FOR MAKING COLD COFFEE AND A STEEPING DEVICE FOR THE IMPLEMENTATION THEREOF

(71) Applicant: Hard Beans Sp. z o.o., Opole (PL)

(72) Inventors: Rafal Matejuk, Luboszyce (PL); Dariusz Andrzejewski, Glucholazy (PL); Waldemar Jamnicki, Nysa (PL); Krzysztof Barabosz, Opole (PL); Maciej Duszak, Wroclaw (PL); Marcin Kucia, Opole (PL); Tomasz Kalla, Kolanowice (PL); Artur Porada, Opole (PL); Katarzyna Porada, Opole (PL); Krzysztof Jaciw, Opole (PL); Pawel Jaczewski, Katowice (PL); Filip Bartelak, Cracow (PL); Piotr Stanislawski, Opole (PL); Katarzyna Jop, Opole (PL)

(73) Assignee: Hard Beans Sp. z o.o., Opole (PL)

( * ) Notice: Subject to any disclaimer, the term of this patent is extended or adjusted under 35 U.S.C. 154(b) by 360 days.

(21) Appl. No.: 16/873,662

(22) Filed: Jun. 5, 2020

(65) Prior Publication Data
US 2020/0404939 A1 Dec. 31, 2020

(30) Foreign Application Priority Data
Jun. 5, 2019 (PL) .......................................... 430152

(51) Int. Cl.
*A47J 31/053* (2006.01)
*A23F 5/26* (2006.01)
(Continued)

(52) U.S. Cl.
CPC ............. *A23F 5/262* (2013.01); *A47J 31/053* (2013.01); *A47J 31/06* (2013.01); *A47J 31/20* (2013.01);
(Continued)

(58) Field of Classification Search
USPC .................................................... 99/303, 308
See application file for complete search history.

(56) References Cited

U.S. PATENT DOCUMENTS

| 201,139 A | * | 3/1878 | Weller | A47J 31/469 |
| | | | | 426/77 |
| 2,583,279 A | * | 1/1952 | Rudahlarnold | A47J 31/053 |
| | | | | 99/298 |

(Continued)

FOREIGN PATENT DOCUMENTS

| GB | 823416 | * | 11/1959 | ............ A47J 31/053 |

*Primary Examiner* — Reginald Alexander
(74) *Attorney, Agent, or Firm* — Shalom Wertsberger; Saltamar Innovations

(57) ABSTRACT

A method for preparing cold coffee involves placing ground coffee in a maceration basket, which is mounted in a maceration tank, and subjected the coffee to maceration by recirculated flow of maceration fluid pumped under pressure by a circulating pump to a hydrating head mounted centrally to the maceration basket. Preferably the maceration basket is completely immersed in the maceration fluid.

A device for preparing cold coffee is also disclosed, the device has a maceration tank, in which a maceration basket 1 for ground coffee is operationally mounted. The maceration basket is formed as a cylinder having a hollow center column dimensioned to receive at least a portion of the hydrating head. A circulating pump circulates the maceration fluid under pressure, from the maceration tank, via the hydrating head and the ground coffee batch disposed in the maceration basket back into the maceration tank.

12 Claims, 3 Drawing Sheets

(51) Int. Cl.
*A47J 31/52* (2006.01)
*A47J 31/46* (2006.01)
*A47J 31/06* (2006.01)
*A47J 31/20* (2006.01)

(52) U.S. Cl.
CPC ......... *A47J 31/468* (2018.08); *A47J 31/5251* (2018.08); *A47J 31/5255* (2018.08)

(56) References Cited

U.S. PATENT DOCUMENTS

| | | | | |
|---|---|---|---|---|
| 3,011,428 A | * | 12/1961 | Kircher | A47J 31/053 99/310 |
| 6,250,208 B1 | * | 6/2001 | Helps | A47J 31/0615 99/305 |
| 8,821,953 B2 | * | 9/2014 | Wen | A47J 31/469 426/77 |
| 2002/0002908 A1 | * | 1/2002 | Clean | A47J 31/40 99/289 R |
| 2012/0219686 A1 | * | 8/2012 | Bombeck | A23F 3/18 426/431 |

* cited by examiner

METHOD FOR MAKING COLD COFFEE AND A STEEPING DEVICE FOR THE IMPLEMENTATION THEREOF

FIELD OF THE INVENTION

The invention relates to a method for making cold coffee by a maceration process and a steeping device for the implementation thereof.

BACKGROUND

Obtaining cold coffee involves subjecting ground coffee to a maceration process using a solvent such as water at low temperature, such as room temperature by way of example. The method of separation of a chemical substance from a solution or mixture of solids is extraction. Maceration is one method of extraction and generally consists of subjecting a mixture of solids containing the substance to be extracted to solvent treatment and then draining the solvent from the non-dissolved residue. When combined with the extracted substance, the solvent becomes known as the macerating fluid.

The efficiency of the macerating process can be increased for example by grinding the solids from which the extract is to be macerated, and by stirring or otherwise creating relative motion between the macerating fluid and the solids during maceration. A more complete maceration can be achieved by repeating the process a plurality of times. Various types of maceration were used in cold coffee production processes.

Step maceration was used according to the invention described in patent application US2019053511 A1 (publication dated Feb. 21, 2019). According to the method presented, a beverage, such as coffee, is cold prepared by soaking coffee in water over a long period (over a dozen hours) in a series of filter bags, with individual bags being soaked in clean water, the resulting maceration fluid, after removing the bag, which undergoes further maceration in clean water, is treated with various additives (e.g. pH buffers, enzymes, anti-foaming agents), or is exposed to a higher temperature, then used to soak further bags.

Shorter maceration time may be achieved for example through dynamic maceration. U.S. patent application US2019075957 (A1) (publication dated Mar. 14, 2019) shows a device containing a container and an elongated basket, lined with mesh, for placement of maceration material. The basket is attached to the cover of the container. The cover has a mechanism for rotating the basket. The container is filled with water. The movement of the maceration material while submerged in water significantly reduces the time needed for cold maceration.

Patent description KR101696190 (B1) (Publication Jan. 13, 2017) presents a device for rapid maceration of cold coffee using high-pressure water. The controlled pressure of the water supplied to the maceration container is between 10 and 50 bar. In addition, this invention uses maceration of coffee with alkaline water produced by supply water ionisation.

Another invention regarding the preparation of cold coffee is presented in CN108618617 (A) (publication dated Oct. 9, 2018). The design of the coffee machine according to the CN '617 invention is based on the design of a well-known coffee machine, which is suitable for obtaining both cold and hot coffee. During the process of cold coffee maceration, the inside of the maceration chamber is isolated from the atmosphere, and cold water under high pressure enters the maceration chamber from one end, and once coffee is extracted, the maceration fluid flows out from the other end of the maceration chamber. Coffee maceration time can be controlled by the operation time of the electric pump. The applied pressure according to this invention is between 1.5 bar and 20 bar.

The JP2012239470 (A) description (published in 2012) presents a universal machine for making cold and hot coffee, with a pressure used ranging from 0.1 to 50 bar (preferably 0.5 to 15 bar).

According to the review of the inventions of methods for obtaining cold coffee, the maceration time has been successfully reduced by using e.g. high pressure or negative pressure (expensive methods). It was also achieved by fluid mixing or movement of coffee particles in a stationary liquid, which, however, requires the use of a motor and moving parts, resulting in increased cost and reduced reliability of the device.

BRIEF DESCRIPTION

The aim of the invention is to obtain an inexpensive and reliable device for producing high-quality cold coffee, preferably without requiring additives. Aspects of the invention would preferably be suitable for use in coffee houses, restaurants and the in the food industry in general. Preferably aspects of the invention would be able to achieve an optimal production time of cold-extracted coffee for use in cafés, such as between 1 hour to at most 2 hours.

The steeping device, according certain aspects of the invention, has met these requirements.

In these specifications the term 'operational' and its variations (such as "operationally" by way of example) should be construed when applied to the steeping device or to portions thereof, to describe the steeping device while it is operated to macerate coffee as described in these specifications, in at least one of the methods and stages described in these specifications and/or as will be clear to a person skilled in the art in view of these specifications. When the term 'operational' and its variations should be construed, when applied to a method disclosed herein, to describe the steps and conditions applied when macerating coffee as described herein, or operating on a steeping device, in all of the respective stages of filling the steeping device, the maceration of the coffee, draining the macerated coffee, and/or cleaning the device. The term macerating fluid should be construed to mean the initial water supplied for macerating, the final cold produced coffee, and the water combined with any ingredients extracted from the coffee at any and all stages and periods during the macerating process. The term "firm" as applied to a mesh screen structural element implies that the mesh is sufficiently firm, either while standing alone or while being supported by adjacent structure, to withstand operational pressures without significant caving which would permanently alter its characteristics. The term 'mesh' may be equivalently used herein as a shorthand notation for a mesh screen.

In a disclosed cold coffee production method, a predetermined amount of ground coffee referred to as the coffee "batch" is placed in a mesh screen filter container, the ground coffee undergoes a process of flow-through maceration with water at above ambient pressure. The method is characterized in that the ground coffee batch is placed in a maceration basket having at least one wall comprising a mesh screen, the maceration basket is mounted in a maceration tank wherein the coffee batch is subjected to maceration by a recirculating flow of macerating fluid pumped theretrough via a hydrating head disposed centrally to the maceration basket, wherein the maceration fluid is recirculated by a circulating pump from the maceration tank to the hydrating head, and the maceration basket or an active portion thereof is immersed in the maceration fluid. After a pre-determined maceration time period, the maceration fluid is drained out of the maceration tank, optionally into a cold coffee container.

Stated differently, the process of cold coffee production in accordance with an aspect of the invention comprises the steps of enclosing a predetermined batch of ground coffee in a macerating basket, mounting the maceration basket in a maceration tank, filling the tank with sufficient amount of macerating fluid to immerse the coffee batch therein, circulating the macerating fluid through the coffee batch or a portion thereof for a predetermined macerating time period, by pumping the macerating fluid at higher than ambient pressure through a hydrating head disposed centrally in in the macerating basket, and draining the macerating fluid from the macerating tank after the macerating period.

In some embodiments the rate of the fluid flow through the hydrating head is between 2 and 25 L/min, and in some embodiments between 6 and 14 L/min. The operating temperature of the macerating fluid during at least a majority portion of the macerating process is between 16° C. and 35° C. The maceration fluid is pumped at a pressure of 1 to 29 bar, measured at the hydrating head inlet. Optionally the maceration fluid is pumped at a pressure from 1 to 22 bar, and commonly from 2 to 6 bar, measured at the hydrating head inlet. Generally a mesh screen hole size is between 10 μm and 500 μm is desired.

Optionally, after the maceration tank is drained and the maceration basket containing the coffee grounds batch is removed, the method further comprises the step of spraying washing water into the macerating tank, for washing the macerating tank from residue. Further optionally the step of washing is performed by spraying water into the macerating tank via the hydrating head.

According to an aspect of the invention, there is provided a steeping device for cold coffee preparation comprising a maceration tank, a maceration basket having at least one wall comprising a mesh screen and removably mountable in the maceration tank, the maceration basket comprising an outer wall and an inner wall, the inner wall comprising at least one layer of firm mesh. The steeping device further comprises a hydrating head having a plurality of nozzles operationally disposed centrally to the maceration basket, and a circulation pump having an inlet in fluid coupling to the macerating tank and an outlet in fluid coupling with the hydrating head.

Preferably the circulation pump is adapted to provide pressure from 1 to 29 bar, operationally measured at the hydrating head inlet. Optionally the pump is adapted to provide a pressure from 1 to 22 bar, and commonly from 2 to 6 bar, operationally measured at the hydrating head inlet. Further optionally the circulation pump is capable of providing macerating fluid flow through the hydrating head of between 2 and 25 L/min, and in some embodiments between 6 and 14 L/min. Generally a mesh screen hole size is between 10 μm and 500 μm is desired.

Optionally, the hydrating head is surrounded by a firm hydrating head mesh screen.

Optionally, the operation of the steeping device is controlled by a controller, and the controller operates at least the circulation pump for predetermined maceration time period, the time period being set in accordance with parameters related to the coffee batch.

Further optionally, the steeping device further comprises a water inlet in controllable fluid coupling with the macerating tank. Optionally the pump is adapted to controllably fill the maceration tank with water. Optionally the water inlet is controllable by a controllable water inlet valve controlled by the controller.

Optionally the macerating tank is in controlled fluid coupling with a drain line. In certain embodiments the drain line is in fluid coupling with a liquid coffee container, for receiving the cold steeped coffee. In certain embodiments a controllable drain valve is coupled to the drain line between the liquid coffee container, for controlling coffee drain thereto. In certain embodiments the fluid circulator is also coupled to the drain line, for assisting drainage of the macerating tank when the drain valve is open.

Optionally in a steeping device which further comprises the water inlet valve and the drain valve, the controller is programmed to operationally control an operation cycle the steeping device by performing the steps of opening the water inlet valve until a predetermined amount of water fills the maceration tank, operating the circulation pump for the macerating period, and operating the drain valve until a majority of the macerating fluid drains from the macerating tank. In certain embodiments the circulating pump is further operated during the water filling and/or the draining. In certain embodiments the controller is further adapted to operate the water inlet valve and the circulating pump after the macerating fluid draining and after the macerating basket is removed from the macerating tank, for washing the macerating tank. In such embodiments water utilized for the washing may be removed manually, or automatically, using the circulating pump or gravity, to drain the wash water.

In some embodiments the maceration basket is formed as a hollow cylinder comprising an inner wall, an outer wall and bottom and top closures respectively. A hollow cylinder is the three-dimensional (3D) volume defined by sweeping an outer 2-dimensional (2D) shape containing an inner 2D shape along a sweeping axis. The sweeping may involve scaling and reshaping of the shapes, resulting in the 3D volume being bounded by an outer wall following the outer shape along the axis, an inner perimeter wall following the inner shape along the axis, and two closures bounded on a plane substantially perpendicular to the axis at the start and finish of the sweeping, respectively. The inner wall of the hollow cylinder shaped maceration basket thus follows the inner wall formed by the sweeping of the inner 2D shape, and the outer wall of the hollow cylinder shaped maceration basket follows the outer wall formed by the sweeping of the outer 2D shape. Similarly, certain forms of hollow cylinders may be obtained by rotating a closed 2D shape about the axis, either a full or a partial rotation. Notably, the sweeping and/or rotating operations described serve merely to define the geometry of a hollow cylinder-shaped maceration basket, and does not require that such geometry-defining actions shall be performed during manufacture of the macerating basket. The macerating basket has at least one surface which is removable to allow filling thereof by the coffee grounds batch.

In certain embodiment the inner and outer 2D shapes form a ring, and the resulting maceration basket is shaped as a cylinder having a central round cavity. In an optional embodiment (not shown) the maceration basket forms a segmented hollow cylinder, or stated differently, a section of the macerating basket parallel to the sweeping axis is removed from the 3D volume, forming two side walls additionally bounding the macerating basket volume.

At least a portion of the hydrating head is operationally disposed in the central cavity of the maceration basket. In some embodiments the hydrating head is operationally coupled to the steeping device and extending at least partially into the macerating tank. Optionally the macerating basket is coupleable to the hydrating head. In some embodiments the hydrating head is coupled to the steeping device by a bayonet coupling.

Optionally the macerating basket outer wall, and/or the top closure, and/or the bottom closure comprise a mesh screen. Any of the mesh screens may be supported by an openwork structure, for providing mechanical support to the mesh and assist it withstand the pressure applied thereto during the maceration process.

Optionally, the maceration tank is rounded in shape, forming a round hollow cylinder.

Optionally the maceration basket has a top-side closure acting as a top cover, and optionally comprising a structural portion and mesh portions corresponding to the inner and outer walls and the bottom closure thereof.

In one embodiment the maceration basket outside shape is round.

The inner wall screen mesh hole size is preferably selected to match the coarseness of the ground coffee and ranges from 10 μm to 500 μm.

Optionally, the hydrating head is detachably mounted in the bottom of the maceration basket.

As shown above, ground coffee according to the invention is macerated by placing it in the maceration basket and hydrating it by flow-through of macerating fluid under pressure from the center of the maceration basket, with the latter immersed in the maceration fluid in the maceration tank. The maceration fluid is recirculated to the hydrating head during the process. The maceration basket is covered at least in part with a fine mesh screen, which does not yield under the pressure from the inside of the basket. Optionally the basket further comprises a support structure (not shown) disposed behind the mesh. The support structure comprises an openwork structure designed to withstand the highest pressures present in the macerating tank and support the mesh in such pressure. The maceration basket is filled to the desired level and closed with a top cover optionally similar in structure to that of the walls and bottom of the maceration basket. Hydration, as mentioned above, is carried out from the center cavity of the maceration basket utilizing the hydrating head. The term "hydrating head" denotes for example a mandrel with holes and/or various types of nozzles or, for example, a nozzle set and the like. The hydrating head is designed to inject, under pressure, maceration fluid into the ground coffee enclosed in the basket. At the beginning of a maceration cycle the maceration fluid has little material extracted from the fluid, and as it ejected from the head it encounters a high resistance from the dry grounds in the coffee batch. During the maceration process fluid paths are formed between coffee particles, and the maceration fluid begins to penetrate deep into the batch, the particles swell, and the pressure inside the maceration basket increases. The increase in pressure allows each coffee particle to be penetrate more thoroughly. This promotes faster maceration of desired components from individual coffee particles. The mesh lining the maceration basket is selected so that before swelling the smallest particles of coffee penetrate through it into the maceration fluid in the tank. After some time, both small and larger particles swell and cause the pressure in the basket to rise. The smallest particles recirculated with the maceration fluid through the hydrating head to the maceration basket are gradually retained by the increasingly tightly packed coffee batch in the basket, and are also retained by the mesh and deposited thereupon. This forms a natural filter both inside the batch and on the mesh itself. At the end of the maceration, almost all the particles are captured in the basket, and the liquid cold coffee obtained after the maceration does not require additional filterartion.

The pumping of the maceration fluid through the coffee batch is repeated until the macerating fluid is sufficiently saturated with coffee macerate.

Due to the settling of natural oils and the formation of a film covering the walls of the maceration tank, it is advantageous that the maceration tank, as well as piping and supporting equipment such as the pump by way of example, be washed after each maceration. In a preferable embodiment of the invention, the maceration tank is washed automatically. Such wash may be done, by way of non-limiting example, by introducing water under pressure into the maceration tank after the maceration process is completed. Such washing is optionally produced by supplying water to the maceration tank via the circulation pump. In such system, the maceration basket containing the spent coffee batch is removed, and pump directs water under pressure to the maceration tank, such as via the hydrating head by way of example.

In certain embodiments of the device, two sizes of basket and tank were presented. A first basket is designed for steeping 8 to 10 L water, and the second basket for steeping 18 to 20 L water. The basket is preferably made of chromium and/or cupronickel steel. The mesh of the basket is preferably made of stainless metal materials, however plastic mesh suitable for contact with foodstuff may also be used. Optionally, the maceration basket has a rotate-and-lock coupling in the bottom portion for quick assembly and disassembly.

This is provided to make it easier for the operator to take out and load the basket with coffee as well as to empty the contents of the basket in the form of spent coffee grounds remaining after the maceration. In the simplest embodiment, the hydrating head is a mandrel, which has a plurality of holes, arranged alternately on the mandrel sides. preferably the holes are arranged along a helical pattern to ensure that the coffee batch soaks evenly. Optionally the mandrel holes are surrounded by a mesh screen to guard from clogging by coffee particles.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale, and certain schematic arrangements do not depict correct spatial relationships and disposition. Understanding that these drawings depict only typical embodiments of the invention and are not therefore to be considered to be limiting of its scope, aspects of the invention will be described and explained with additional specificity and detail through the use of the accompanying drawings in which.

DETAILED DESCRIPTION

Embodiments of a steeping device and optional components will be described below, by way of exemplary illustration only. The described embodiments should not be construed as limiting the scope of different aspects and embodiments of the invention.

Figure 1:
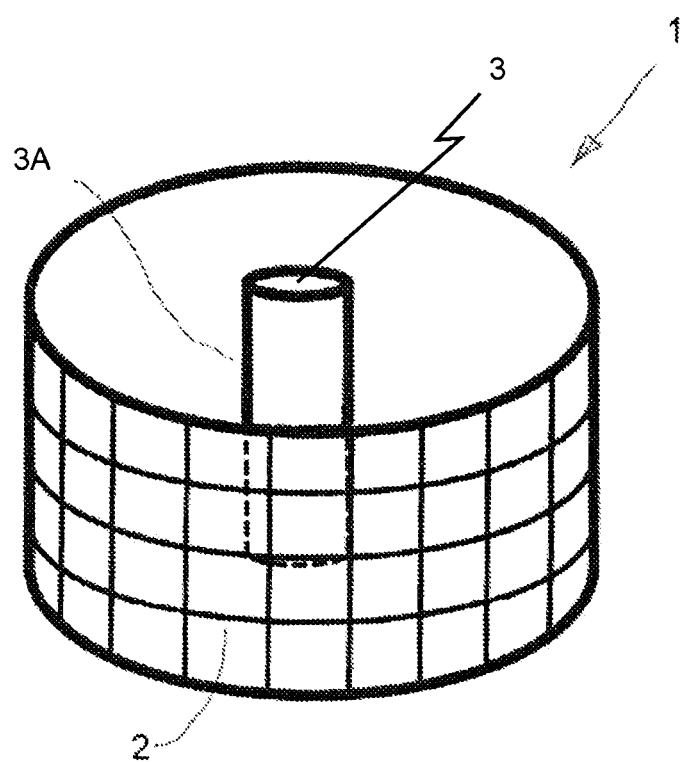
FIG. 1 schematically shows the basket with the center column in an axonometric view.

FIG. 1 depicts one embodiment of a maceration basket. The maceration basket 1 comprises a hollow cylinder with an outer perimeter wall 2 and a center column 3 defined by an inner perimeter wall 3A. The maceration basket defines a volume bounded between the outer wall 2, the inner wall 3A, a top cover 5 and a bottom closure 5A respectively, such that the center column 3 volume is defined by the inner wall but is not included in the volume of the maceration basket enclosure.

The inner wall perimeter and at least one more bounding wall comprises a firm fine mesh (not shown) selected to contain the coffee grounds batch while allowing fluid flow through the mesh. Optionally, the mesh hole size is between 10 μm and 500 μm. In the depicted embodiment both the inner wall and the outer wall are at least partially formed by the mesh screen. Optionally the top and bottom closures may also comprise a mesh screen, in whole or in part.

Figure 2:
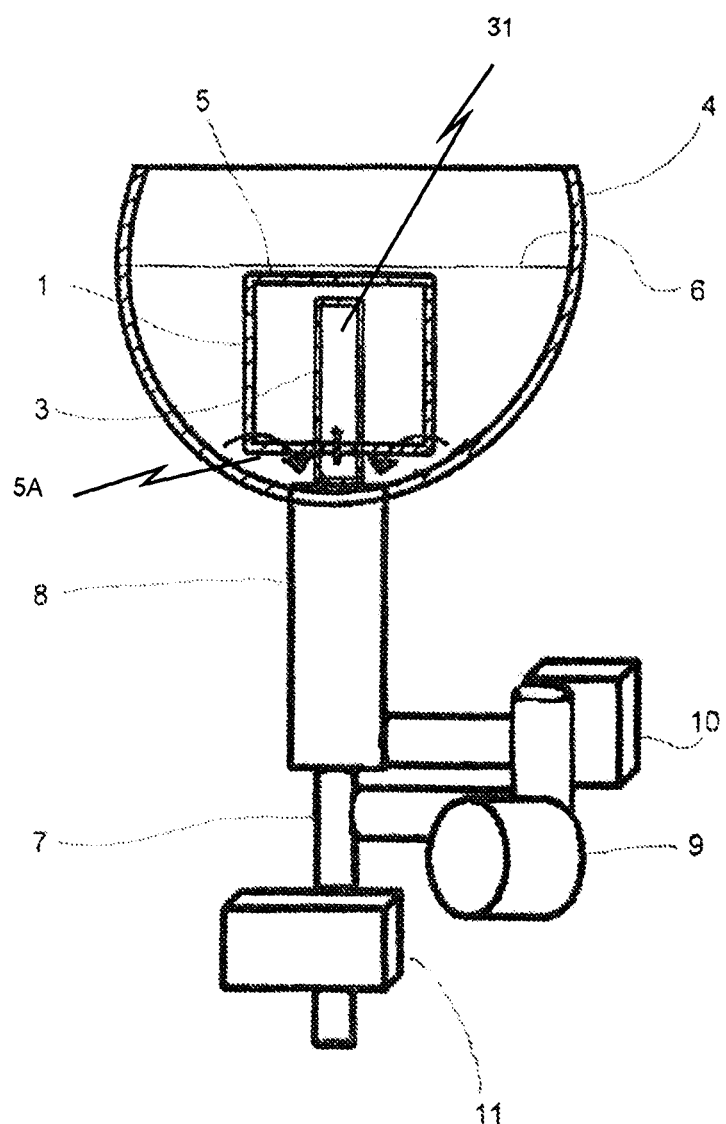
FIG. 2 is a schematic representation of the section through the tank and further parts of the steeping device.
Figure 4:
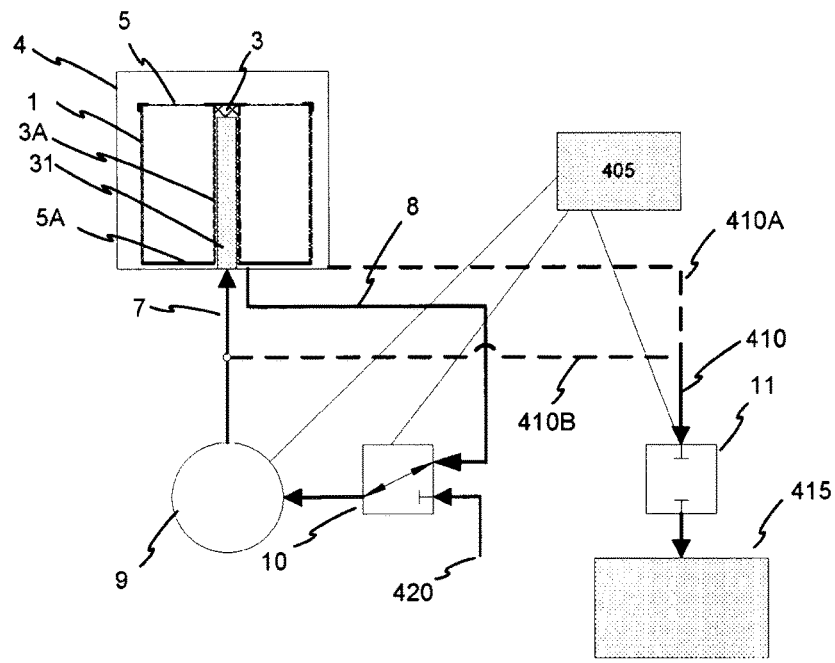
FIG. 4 depicts schematically certain elements of a maceration device, including certain optional fluid flow elements.

FIG. 2 depicts schematically an embodiment of the steeping device, depicting a cross section of the maceration tank 4, the maceration basket 31, and the hydrating head. FIG. 4 depicts schematically a steeping device including a controller, and an optional fluid coupling diagram. In FIG. 2 the maceration tank is shown as a truncated sphere, however this shape is not mandatory, as may be seen by way of example in FIG. 4. The maceration tank is coupled to a supply line 7 in fluid coupling to the outlet of circulation pump 9, and a discharge pipe 8 in fluid coupling to the inlet of the pump 9. FIG. 1 depicts an optional arrangement where the discharge line 8 and the supply line 7 as coaxial, however such arrangement is not mandatory. In the embodiment of FIG. 2 the hydrating head 31 is surrounded by a mesh, so that the coffee particles do not clog the hydrating holes.

The maceration tank is adapted to receive the hydrating head 31 such that it will be in fluid coupling with the supply line 7. The center column 3 of maceration basket 1 is dimensioned to receive therein the hydrating head 31. In some embodiments the hydration head is integral to the maceration basket. Optionally the maceration basket is lockable to the hydrating head such that the basket 1 is firmly held by the hydrating head during operation. Optionally the hydrating head 31 is removable from the macerating tank 4.

FIG. 4 depicts an optional controller 405 configured for controlling certain aspects of the operation of the steeping device. Notably, a steeping device having a controller is advantageous and thus the structure of the steeping device and the process described below shall relate to a steeping device having such controller and to certain operations in the method as being controlled by the controller. However it is explicitly noted that any and all operations described as performed by the controller are optional and may be performed manually.

The controller 405 may perform any and all of the functions of controlling the maceration time period, controlling the circulating pump 9 operation, controlling the operation of circulating valve 10, and controlling the operation of drain valve 11. The controller may receive input from an operator and/or from various sensors.

The steeping device further comprises a drain line 410. The drain line is in direct or indirect fluid coupling with the maceration tank 4. Two optional arrangements are shown by the broken lines 410A and 410B. In the option depicted by line 410A the drain line comprises both pipe sections 410 and 410A, forming substantially direct fluid coupling between the maceration tank 4 and drain valve 11, such that when the drain valve 11 is opened fluid in macerating tank is gravity fed to coffee container 415. Such operation is simple, however draining may take longer time than necessary. In the option depicted by broken line 410B, the drain line pump comprises discharge pipe 8, circulating valve 10 pump 9, pipe section 410B and pipe section 410, which together form a drain line forming fluid coupling between maceration tank 4 and drain valve 11, and therefrom, to coffee container 415. Such arrangement allows faster drainage by utilizing the pump 9. Notably certain connecting piping may not have been mentioned, but shall be cleared to the skilled in the art.

Circulation of the macerating fluid is established by the circulating pump 9 via circulating valve 10. Discharge pipe 8 is coupled to an inlet of the circulating valve 10, and the outlet of the valve 10 is in fluid coupling with circulating pump 9. The valve in FIG. 4 is depicted as a changeover valve. As described above, in some embodiments the steeping device comprises a water supply 420, which in the embodiment depicted in FIG. 4 is coupled to the second inlet of circulating valve 10.

Figure 3:
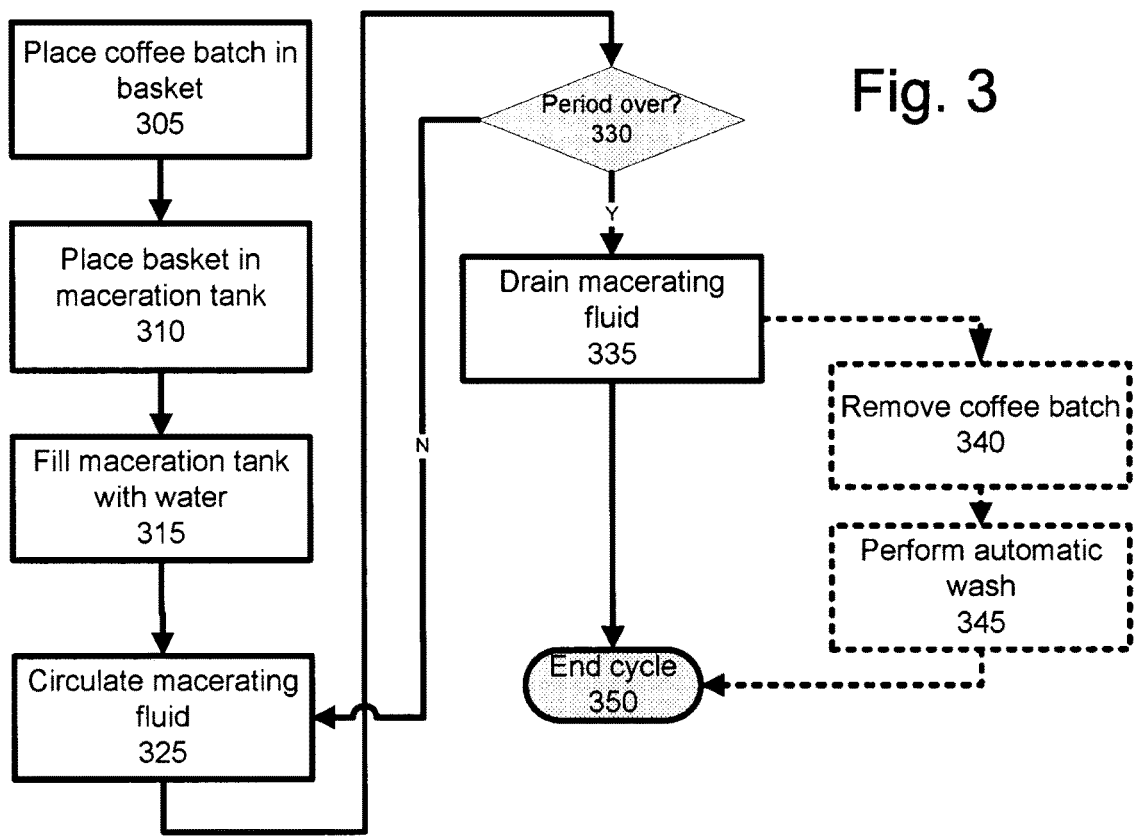
FIG. 3 is a simplified flow diagram of the coffee making process, including optional steps.

FIG. 3 depicts a simplified flow diagram of the process for making coffee by a maceration process carried out by the like of a steeping device as described herein. Operationally, a hydrating head 31 is disposed in the center column of the maceration basket 1. A selected amount of ground coffee is placed 305 in the maceration basket 1 and the basket is closed with the top cover 5. The maceration basket 1 is then mounted 310 in the maceration tank 4 such that the hydrating head 31 is at least partially disposed in center column 3. The hydrating head is in fluid coupling at least with the circulating pump via a supply line 7. In some implementations the hydrating head is first mounted in the macerating tank, in some implementations the hydrating head is permanently mounted in the macerating basket, and in some implementations the hydrating head is first mounted to the macerating tank and the assembly is then mounted in the maceration tank 4. Preferably but not mandatorily, the hydrating head 31 is locked in the macerating tank utilizing any desired quick latching arrangement. Preferably, there is a fit between the hydrating head and the maceration tank. Optionally, the macerating basket 1 is latched onto the hydrating head. At least a portion of the hydrating head extends substantially along the whole length of the center column 3 of the macerating basket 1.

The maceration tank 4 is then filled 315 to a desired level. Baskets of different capacities may be utilized in a given macerating tank, to accommodate a desired coffee grounds batch. The amount of water initially placed into the macerating tank is adjusted accordingly, so that an optimal, known maceration ratio is maintained between the amount of water and coffee batch size, namely about 60 grams of coffee per 1 liter of water. Preferably the whole maceration basket is submerged in the water, such that the coffee level in the maceration basket 1 is under the water level 6. Water may be inserted into the macerating tank by a pump 9 through the supply line 7 and the hydrating head 31, or otherwise supplied. In the embodiment depicted in FIG. 4 the controller switches the circulating valve 10 to couple the outlet thereof to the inlet coupled to the water supply 410, allowing water to fill the maceration tank 4. Optionally the controller also operates circulating pump 9 to pump the water into the maceration tank.

After the desired quantity of water to be macerated, selected according to a coffee batch size, is filled in the maceration tank 4 the circulating valve 10 is switched to couple the valve 10 outlet to the discharge pipe 8, and circulating pump 9 is operated to recirculate 325 the maceration fluid from the maceration tank 4 through the discharge pipe 8 to the pump 9, thence through the line 7 to the hydrating head 3.

The maceration time period may be experimentally predetermined, taking into account parameters such as the individual coarsenesses of the ground coffee, the desired quality of the final product, and the like. Optionally the maceration time period is a parameter set for automatic process control by the controller.

After the macerating time period is completed 330, the recirculation of the maceration fluid is stopped and drain valve 11 is opened to direct the maceration fluid to the coffee container 415. Optionally this may also be performed by the controller. In optional embodiments utilizing the 410B option, the pump is operated in conjunction with the drain valve 11, to accelerate the draining process. In some embodiments this completes the process.

As described above the process of making coffee may optionally further comprise a washing step. FIG. 3 depicts the optional washing step in broken lines, where, after the macerating fluid, now cold prepared coffee, is drained 335. After manually removing the coffee batch is removed 340, such as by removing the maceration basket 1 with coffee grounds, the maceration tank 4 is automatically washed 345. Such washing may be performed by pumping water into the maceration tank by pump 9, optionally via the hydrating head 31. Draining of the washing fluid is recommended and may be carried out by a dedicated valve (not shown), however it is optional to utilize the water used for washing as at least a part of the macerating fluid for the next cycle. Coffee grounds can be further used in a variety of applications (e.g. gardening, cosmetics) and may be transferred to suitable containers. After washing, the unit is ready for a new cycle of preparing cold coffee.

Various components of the steeping device may be arranged and packaged as shown for example by FIG. 2, or in any other convenient arrangement and/or packaging.

Certain construction and operation constructs may be selected according to common wisdom in the art, and are a matter of engineering choice. By way of example numerous mounting methods are known in the art and the skilled person designing the steeping device may elect any appropriate method according to the requirements (by way of example water tightness is highly recommended for fluid coupling between the hydrating head and the supply line 7, but is of lesser importance in the coupling of the maceration basket to the hydrating head, if used). Similarly, the skilled in the art would recognize numerous variations to the simplified piping diagram of FIG. 4, while obtaining the same functionality. Such engineering choices and modifications fall under the scope of the invention.

Notably, whenever the term 'and/or' is used in these specifications and the attached claims, it should be construed as any number, combination or permutation of all, one, some, a plurality or none of each of the item or list mentioned. It is also understood that certain constructs are referred to in singular or plural terms, but either singular or plural respective items may be utilized unless otherwise stated. It is further understood that the term "or" should be construed as an inclusive "or" to include all items in a list and not intended to be limiting and means any number, combination or permutation of all, one or plurality of each of the item or list mentioned, unless the term 'or' is explicitly defined as exclusive, or if the context would clearly indicate an exclusive or to the skilled artisan. It is also understood that "include(s)" and/or "including" means "including but not limited to" any number, combination or permutation of all, one or plurality of each of the item or list mentioned.

Versions of the invention may be made with any and all suitable materials desired as needed for their respective appropriate use and the invention and embodiments thereof are not limited by the type of materials used in implementing thereof.

Although the foregoing invention has been described in detail by way of illustration and example, it will be understood that the present invention is not limited to the particular description and specific embodiments described but may comprise any combination of the above disclosed elements and their equivalents and variations thereof, many of which will be obvious to those skilled in the art in view of the present disclosure, and the invention extends to such variations.

We claim:

1. A steeping device for making cold coffee, the device comprising:
   a maceration tank;
   a closeable maceration basket removably mountable in the maceration tank, the maceration basket comprising an openwork outer support wall and an inner wall, the inner wall comprising at least one layer of mesh screen;
   a hydrating head having a plurality of holes operationally disposed centrally to the maceration basket;
   a mesh surrounding the hydrating head; and,
   a circulation pump having an inlet in fluid coupling to the macerating tank and an outlet in fluid coupling with the hydrating head.

2. The steeping device of claim 1 wherein the maceration basket inner wall defining a center cavity in the maceration basket, and wherein the hydrating head is at least partially disposed within the cavity.

3. The steeping device of claim 1, wherein the macerating basket is shaped as a hollow cylinder.

4. The steeping device of claim 1, wherein the circulation pump is adapted to provide pressure from 1 to 29 bar.

5. The steeping device of claim 1, wherein the circulation pump is adapted to provide a fluid flow of between 2 and 25 L/min.

6. The steeping device of claim 1, wherein the circulation pump is adapted to provide a fluid flow of between 6 and 14 L/min, at a pressure of between 2 and six bar.

7. The steeping device of claim 1 wherein the mesh screen hole size is between 10 μm and 500 μm.

8. The steeping device of claim 1 further comprising a water inlet in controllable fluid coupling with the maceration tank.

9. The steeping device of claim 1 further comprising a controller adapted to at least operate the circulation pump for a maceration time period, the time period being set in accordance with parameters related to a coffee batch being processed by the device.

10. The steeping device of claim 9 further comprising a water inlet in controllable fluid coupling with the maceration tank, wherein the controller further controls fluid flow from the water inlet and the maceration tank.

11. The steeping device of claim 1 further comprising a liquid coffee container and a drainpipe in controllable fluid coupling between the macerating tank and the liquid coffee container.

12. The steeping device of claim 10, further comprising a controller adapted to controllably couple between the drainpipe and the liquid coffee container.

\* \* \* \* \*